US008554809B1

(12) United States Patent
Zhou et al.

(10) Patent No.: US 8,554,809 B1
(45) Date of Patent: Oct. 8, 2013

(54) CALCULATING QUOTA USAGE WITHOUT IMPACTING FILE SYSTEM SERVICES

(75) Inventors: Yingchao Zhou, Beijing (CN); Wei Kang, Beijing (CN); Weigang Zhong, Beijing (CN); Chen Gong, Beijing (CN); Kevin Xu, Warren, NJ (US); Sitaram Pawar, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 103 days.

(21) Appl. No.: 13/116,913

(22) Filed: May 26, 2011

(51) Int. Cl.
*G06F 7/00* (2006.01)

(52) U.S. Cl.
USPC .......................................... 707/821; 707/822

(58) Field of Classification Search
USPC ................................................. 707/821, 822
See application file for complete search history.

(56) References Cited

U.S. PATENT DOCUMENTS

| | | | |
|---|---|---|---|
| 5,713,013 A | 1/1998 | Black | |
| 5,781,801 A | 7/1998 | Flanagan et al. | |
| 6,625,591 B1 | 9/2003 | Vahalia et al. | |
| 6,823,336 B1 | 11/2004 | Srinivasan et al. | |
| 6,938,039 B1 | 8/2005 | Bober et al. | |
| 7,178,145 B2 | 2/2007 | Bono | |
| 7,574,461 B1 | 8/2009 | Armorer et al. | |
| 7,822,927 B1 | 10/2010 | Scheer | |
| 7,849,112 B2 | 12/2010 | Mane et al. | |
| 2003/0009484 A1 | 1/2003 | Hamanaka et al. | |
| 2003/0140051 A1 | 7/2003 | Fujiwara et al. | |
| 2006/0117135 A1* | 6/2006 | Thind et al. | 711/112 |

OTHER PUBLICATIONS

Vahalia, Uresh, "Unix Internals: The New Frontiers," 1996, p. 261-290, Prentice-Hall, Inc., Upper Saddle River, NJ.

* cited by examiner

*Primary Examiner* — Hung Q Pham
(74) *Attorney, Agent, or Firm* — Richard Auchterlonie; Novak Druce Connolly Bove + Quigg LLP

(57) ABSTRACT

An online tree quota check tool computes quota usage of files in a directory tree while the structure of the directory tree keeps changing due to concurrent write access by other applications and clients. The quota check tool computes the quota usage without interfering with the ongoing file access operations that change the directory content and quota usage. A quota check database keeps track of which files have been checked and which have not, so that each file is checked and its quota usage is accumulated once and only once while directories are moved and directory scans are restarted as a result of the changing directory content. File system operations are modified to synchronize with the online tree quota check. The quota check tool can be single threaded or multi-threaded. A multi-threaded tool dispatches idle directory iteration threads to scan subdirectories in the directory tree.

20 Claims, 13 Drawing Sheets

CALCULATING QUOTA USAGE WITHOUT IMPACTING FILE SYSTEM SERVICES

FIELD OF THE INVENTION

The present invention generally relates to file servers, and more particularly to an online tree quota check tool that scans a directory tree of a file system in order to calculate quota usage in a file server without impacting file access operations upon the file system.

BACKGROUND OF THE INVENTION

A file server is a special-purpose computer adapted for attachment to a data network and programmed for providing clients with access to computer files. The file server is designed primarily to enable the rapid storage and retrieval of data in the files.

A conventional file server has limits on the total available storage capacity and also on the maximum number of files that can be stored at any given time. Due to these limits, a file system manager in the file server keeps a running count of the number of files presently stored in the file server and a running count of the total number of bytes of storage contained within the files. When the running counts approach the limits of the file server, the file system manager sends a warning message to an administrator so that the administrator may recover some free storage capacity by deleting files or moving files off of the file server to archival storage. If the administrator does not recover a sufficient amount of free storage, then clients of the file server may be denied service when the clients attempt to extend files or create new files.

A conventional file server also has the ability to set and enforce storage quotas per file system, per user, and per user group. For example, the file system manager computes a running count of the number of files in each file system, the number of files owned by each user, and the number of files owned by each group. The file system manager also computes a respective running count of the total number of bytes contained in the files of each file system, the total number of bytes contained in the files owned by each user, and the total number of bytes contained in the files owned by each user group. Each storage quota is a specified upper bound on such a running count of the number of files or total number of bytes. The file system manager enforces the storage quotas by denying a request to extend a file or to create a new file if grating the request would cause a quota to be exceeded.

Sometimes the running count mechanism is unavailable or inoperative for indicating the quota usage for a file system, a user, or a user group. For example, a running count may become lost or corrupted due to a hardware or software failure. The running count may also be unavailable if user or user group quotas are added to a file server that previously did not have user or user group quotas. If a running count is unavailable or inoperative, then the file system directory tree needs to be scanned in order to read the file attributes required for computing the quota usage. Such a scan of the file system directory tree and computation of the quota usage of the files in the directory tree is known as a quota check of the directory tree.

A conventional quota check of the directory tree requires the directory tree to be held "offline" for file access operations that change the quota usage of the files or that move the files. File access operations that change the quota usage include operations that create or delete files, or that extend or truncate files. File access operations that move the files include operations that rename files. During a conventional quota check, the file system has been held offline for such file access operations by "freezing" the file system during the quota check, or by unmounting the file system and remounting the file system as "read only" mode during the quota check. In either case, file access operations that write to the files have been blocked during the conventional quota check.

SUMMARY OF THE INVENTION

It is desired to provide an online quota check tool that does not interfere with file access operations. Such an online quota check tool should permit another application or client to have immediate read-write access to the files of a file system during system recovery of the running quota usage counts for the file system or during an initial imposition of quotas upon users or user groups of the file server. Such an online quota check tool should run as a background task to verify the running quota usage counts for the file system without interfering with ongoing file access operations.

In accordance with one aspect, the present invention provides a method of a data processor of a file server executing computer instructions stored on a non-transitory computer-readable storage medium. The execution of the computer instructions performs the step of (a) accumulating quota usage of files in a directory tree when scanning the directory tree and a network client has concurrent write access to the files in the directory tree and changes directory structure of the directory tree. The execution of the computer instructions also performs the step of (b) marking each file in the directory tree as checked for quota usage when the quota usage of said each file is accumulated, and inspecting the files for checked status during the scanning of the directory tree so that quota usage of checked files is not accumulated more than once during the scanning of the directory tree. The execution of the computer instructions also performs the step of (c) in response to a rename request by the network client to rename a specified file concurrent with the scanning of the directory tree when the rename request specifies a destination directory that is found to be marked as checked, accumulating quota usage of the specified file. The execution of the computer instructions also performs the step of (d) restarting a scan of a modified directory in the directory tree to accumulate quota usage of files in the modified directory when the concurrent write access of the network client has modified content of the modified directory during the scan. Finally, the execution of the computer instructions performs the step of (e) using the accumulated usage of the files in the directory tree to set quota running counts maintained by a file system manager in the file server and used by the file system manager to deny a network client request that would cause a quota running count to exceed a quota limit.

In accordance with another aspect, the invention provides a file server. The file server includes data storage storing a file system, a data processor coupled to the data storage for accessing the file system, a network adapter for connecting network clients to the data processor for receiving file access requests from the network clients and exchanging file data between the network clients and the data processor; and non-transitory computer readable storage medium coupled to the data processor and storing computer instructions. The computer instructions, when executed by the data processor, perform the steps of: (a) accumulating quota usage of files in a directory tree of the file system when scanning the directory tree and a network client has concurrent write access to the files in the directory tree and changes directory structure of the directory tree; (b) marking each file in the directory tree as checked for quota usage when the quota usage of each file is accumulated, and inspecting the files for checked status during the scanning of the directory tree so that quota usage of checked files is not accumulated more than once during the scanning of the directory tree; (c) in response to a rename request by the network client to rename a specified file concurrent with the scanning of the directory tree when the rename request specifies a destination directory that is found to be marked as checked, accumulating quota usage of the specified file; and (d) restarting a scan of a modified directory in the directory tree to accumulate quota usage of files in the modified directory when the concurrent write access of the network client has modified content of the modified directory during the scan.

In accordance with a final aspect, the invention provides a file server. The file server includes data storage storing a file system, a data processor coupled to the data storage for accessing the file system, a network adapter for connecting network clients to the data processor for receiving file access requests from the network clients and exchanging file data between the network clients and the data processor, and non-transitory computer readable storage medium coupled to the data processor and storing computer instructions. The computer instructions include a quota check management component for initiating an online tree quota check of a directory tree of the file system while a network client has concurrent write access to the files in the directory tree and changes directory structure of the directory tree. The computer instructions also include a quota check directory iteration routine for scanning a specified directory of the directory tree and accumulating quota usage of files in the specified directory and initiating scans of subdirectories of the specified directory to accumulate quota usage of files in the subdirectories. The computer instructions also include a quota check database access routine for accessing a quota check database of files that have been checked for quota usage since the start of the online quota check. The computer instructions further include modified file access routines for use by a file system manager during the online quota check. The computer instructions, when executed by the data processor, perform the steps of: (a) performing the online tree quota check of the directory tree of the file system by executing the quota check directory iteration routine to scan directories of the directory tree while a network client has concurrent write access to the files in the directory tree and changes directory structure of the directory tree; (b) accessing the quota check database to keep a record of files in the directory tree that have been checked for quota usage by accumulating quota usage, and accessing the quota check database during the scanning of the directory tree so that quota usage of checked files is not accumulated more than once during the scanning of the directory tree; (c) in response to a rename request by the network client to rename a specified file concurrent with the scanning of the directory tree when the rename request specifies a destination directory that is found in the quota check database, accumulating quota usage of the specified file; and (d) restarting a scan of a modified directory in the directory tree to accumulate quota usage of files in the modified directory when the concurrent write access of the network client has modified content of the modified directory during the scan.

BRIEF DESCRIPTION OF THE DRAWINGS

Additional features and advantages of the invention will be described below with reference to the drawings, in which.

Figure 1:
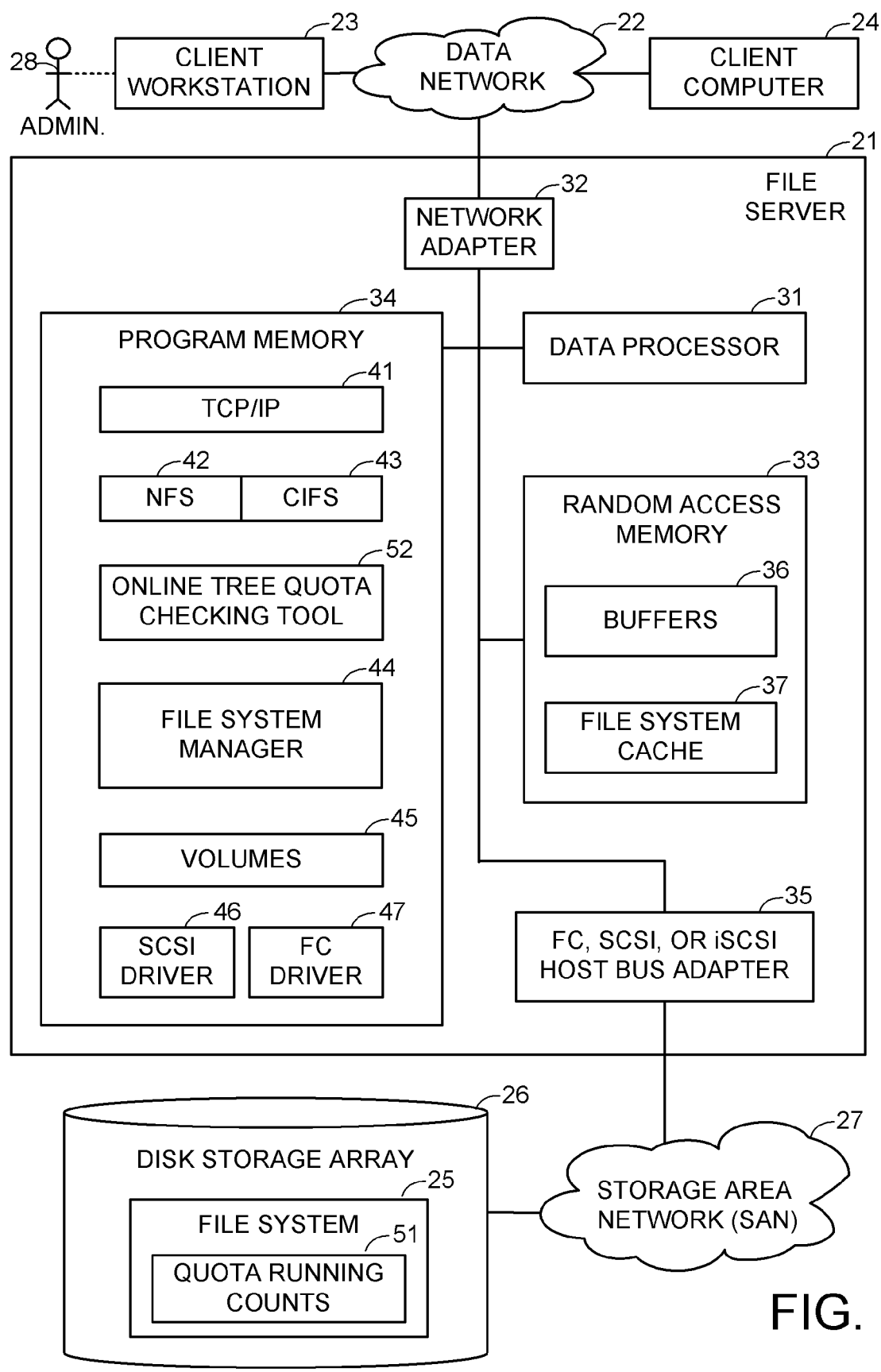
FIG. 1 is a block diagram of a file server including an online tree quota checking tool in accordance with the invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a file server 21 in a data network 22 for providing clients 23, 24 with shared access to a file system 25 in a disk storage array 26. A storage area network 27 links the disk storage array 26 to the file server 21. The client 23 is a workstation of a human user 28 serving as an administrator of the file server 21. The client 24 is a mainframe computer.

The file server 21 includes a data processor 31, a network adapter 32 linking the data processor to the data network 22, random access memory 33, program memory 34, and a Fibre-Channel (FC), Small Computer System Interface (SCSI), or Internet SCSI (iSCSI) host bus adapter 35. The data processor 31 is a general purpose digital computer data processor including one or more core central processing units (CPUs) for executing computer program instructions stored in the program memory 34. The random access memory 33 includes buffers 36 and a file system cache 37.

The program memory 34 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 34 includes a stack of program layers for responding to requests from the network clients 23, 24 for access to files in the shared file system 25. These program layers include a network communication layer 41 supporting communication using the Transmission Control Protocol over the Internet Protocol (TCP/IP), network file access protocol layers 42, 43, a file system manager 44, a logical volumes layer 45, an SCSI driver 46, and a Fibre-Channel (FC) driver 47. The network file access protocol layers 42, 43 include a program module 42 for clients using the Network File System (NFS) protocol, and a program module 43 for clients using the Common Internet File System (CIFS) protocol. The file system manager 44 maintains the file system cache 37 in the random access memory 33 and maintains the shared file system 25 in the disk storage array 26. For example, files are constructed and organized into a UNIX-based file system built upon a logical volume of storage, as further described in Uresh Vahalia, Unix Internals—The New Frontiers, Chapter 9, File System Implementations, pp. 261-290, Prentice-Hall, Inc., Upper Saddle River, N.J. (1996).

In order to allocate storage of the disk storage array 26, the file system manager 44 maintains quota running counts 51 of the number of files in the file system, the number files owned by each user and each user group, the total number of bytes contained in the files of the file system, and the total number of bytes contained in the files owned by each user and each user group. When the running count for a user approaches a pre-established limit for each user, a warning message is sent to the user. In addition, whenever the file system manager receives a file access request from an application or client and the file access request would require additional storage resources, the file system manager computes an updated value of the running counts for the user, and compares the updated value of the running counts for the user to the quota limits for the user. If the updated value of a running count for the user exceeds the respective quota limit for the user, then the file system manager denies the file access request.

In accordance with the invention, the file server 21 is provided with an online tree quota checking tool 52 for scanning the file system 25 to obtain file attributes and accumulate the file attributes to compute counts of the files and the total bytes contained in the files of the file system 25, and to compute counts of the files owned by each user and each user group and the total bytes contained in the files owned by each user and each user group. The online tree quota checking tool can be used to verify the validity of the quota running counts 51 and to restore the quota running counts if the quota running counts become corrupted by a hardware or software error. The online tree quota checking tool 52 can also be used to preset the quota running counts 51 if the file system 25 has been imported from the data network 22. The online tree quota checking tool 52 can also be used to preset the quota running counts if the file system 25 was created when the file system manager 44 did not have user or user group quotas, and now it is desired to compute the quota usage of the users and user groups, and impose storage quotas upon the users and user groups based on the present quota usage of the users and user groups.

Figure 2:
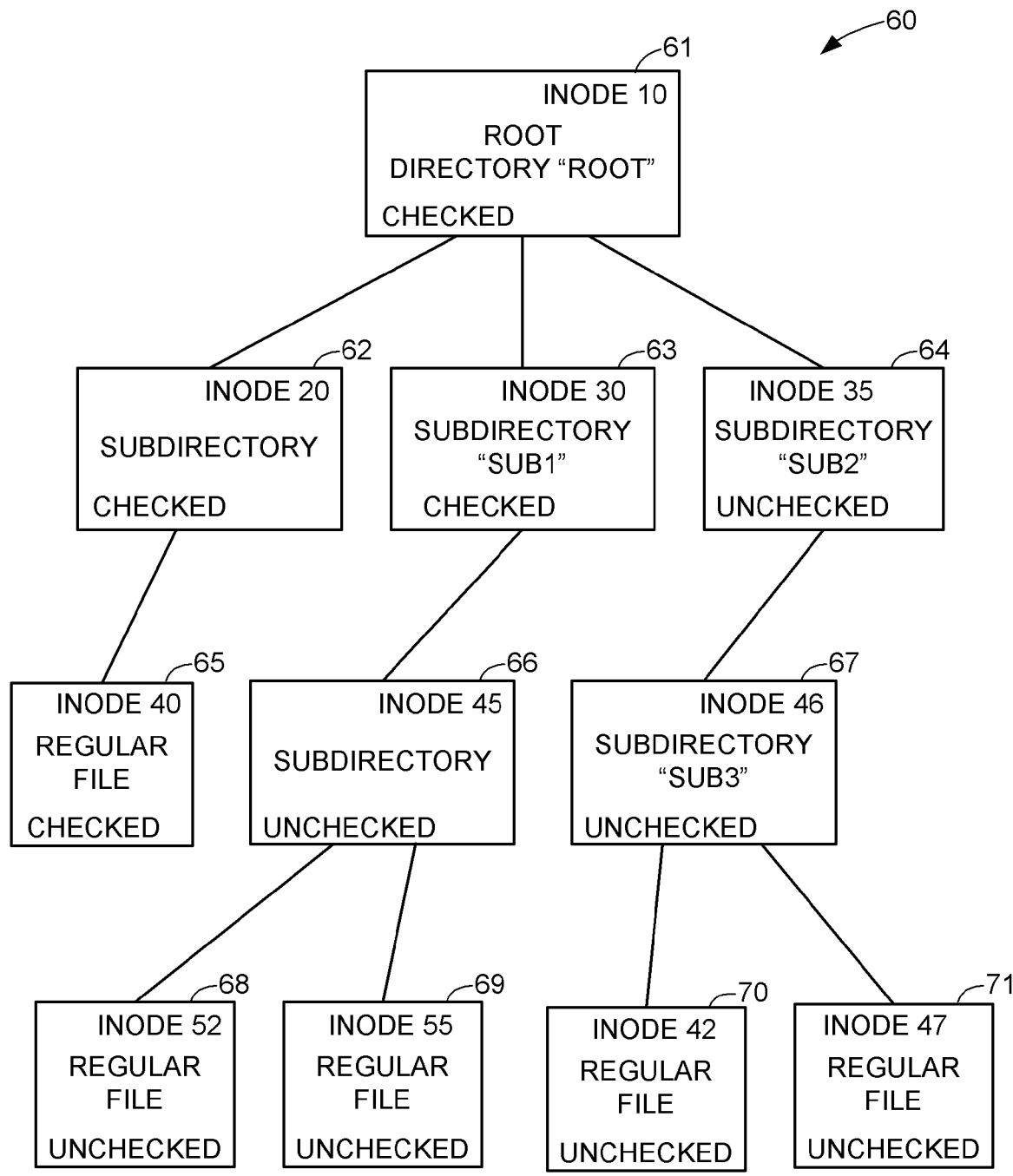
FIG. 2 is a block diagram of a directory tree during operation of the online tree quota checking tool.

FIG. 2 shows the directory tree 60 of the file system (25 in FIG. 1) during operation of the online tree quota checking tool. The online tree quota checking tool scans the directory tree 60 to obtain the number of bytes of storage used in each file. Upon visiting each file, the online quota checking tool increments a set of accumulators for the file system and for each established user and for each established user group in order to accumulate the number of files and the total number of bytes in each file for the file system, each established user, and each established user group. An established user is a user having the privilege of creating and modifying a file in the file system. An established user group is a predefined group of users for which a group quota can be established. For example, the group quota can set a quota limit that is less than or equal to the sum of the quota limits of the users in the group.

During a scan of a directory tree, the online tree quota checking tool maintains a state of "checked" or "unchecked" for each file in the directory tree. At the start of the scan, each file has a state of "unchecked." The state of each file changes from "unchecked" to "checked" when the quota check accumulators are incremented with the quota usage of the file. The quota check is finished when the state of every file in the directory tree has changed to "checked."

The online tree quota check tool is constructed so that other applications and clients have immediate read-write access to the files of the file system while the online tree quota check tool is scanning the directory tree of the file system 25. Moreover, the quota check tool is constructed so that other applications and clients may change the set of files included in each directory, by adding files, deleting files, and moving files between directories of the file system.

The most difficult challenge is to scan the directory tree in such a way that the quota accumulators are updated once and only once for each and every file in the file system while other applications or clients concurrently move subdirectories between directories of the directory tree. For example, FIG. 2 shows "checked' and "unchecked" states resulting in the middle of a depth-first scan of the directory tree 60.

The directory tree 60 includes a root directory 61. The root directory includes subdirectories 62, 63, and 64. The subdirectory 62 includes a regular file 65. The subdirectory 63 includes a subdirectory 66. The subdirectory 64 contains a subdirectory 67. The subdirectory 66 includes a regular file 68 and a regular file 69. The subdirectory 67 includes a regular file 70 and a regular file 71.

In general, a directory is a special kind of file that may include a listing of regular files and other directories known as subdirectories. A regular file is not a directory. A directory is a "branch node" in the directory tree if the directory includes other files, or else the directory is a "leaf node" in the directory tree. A regular file always is a "leaf node" in the directory tree. Each and every file in the file system has a unique inode number serving as an identifier of the file.

For the directory tree scanning in FIG. 2, after a directory is quota checked by updating the quota accumulators with the quota usage of the directory, a scan is begun of the files in the directory, and the scan of the files in the directory includes a quota check of each file visited during the scan. The root directory 61 is the first directory to be quota checked. The scan of the root directory 61 has caused the subdirectory 62 and the subdirectory 63 to be checked, but the scan of the root directory 61 has not been completed because the subdirectory 64 is unchecked. The subdirectory 62 has also been scanned, so that the regular file 65 is checked. The subdirectories 66 and 67 are unchecked, and the regular files 68, 69, 70, and 71 are unchecked.

Figure 3:
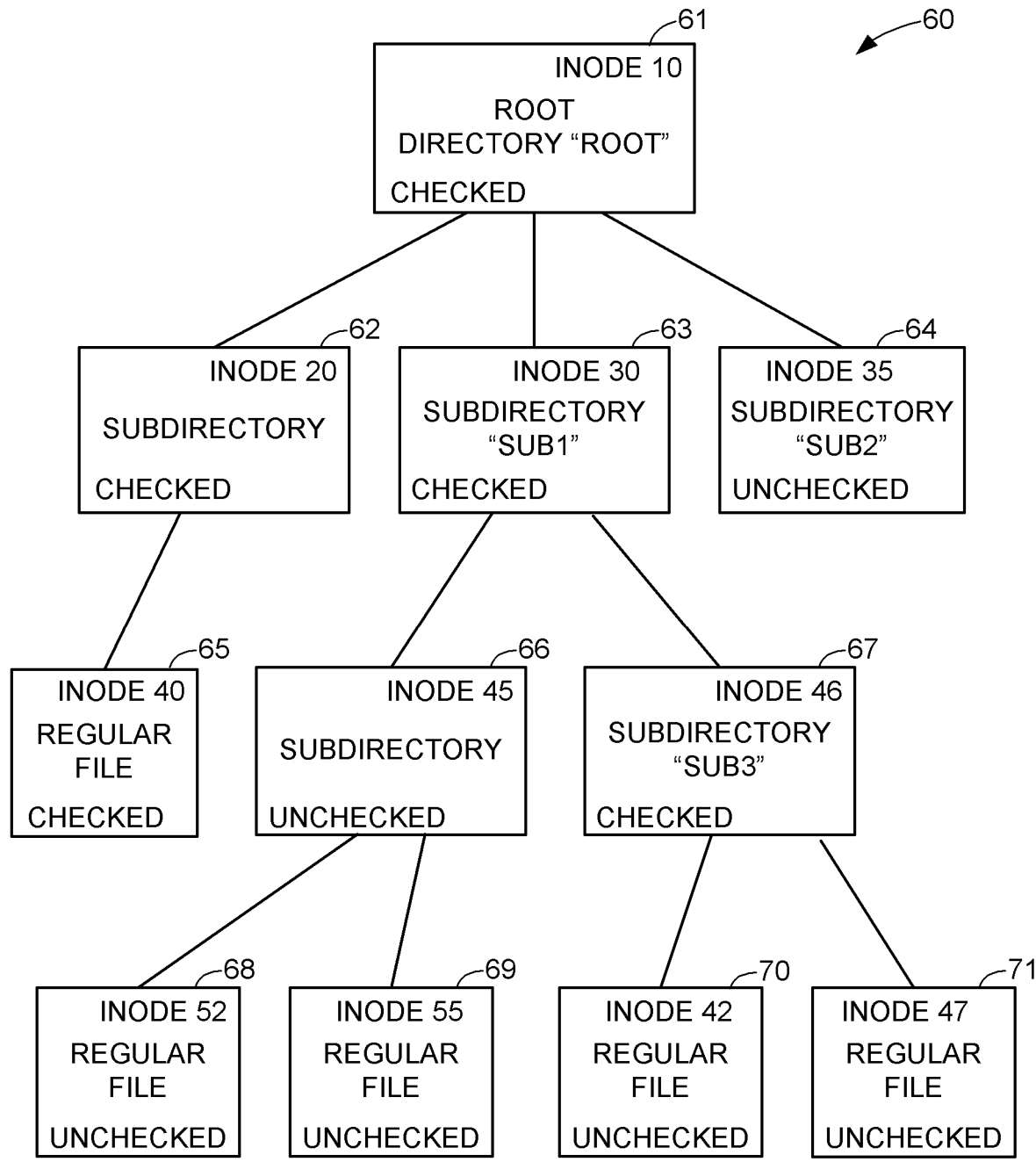
FIG. 3 is a block diagram of the directory tree of FIG. 2 after modification during online quota checking by a rename operation upon a subdirectory in the directory tree.

FIG. 3 shows the directory tree 60 after the directory structure has been modified during online tree quota checking by a rename operation upon the subdirectory 67. For example, a rename request has the format of "RENAME SOURCE DES- TINATION" where "SOURCE" is the original pathname of a file and "DESTINATION" is a new pathname for the file. The new directory structure of FIG. 3 results from execution of the rename request "RENAME /ROOT/SUB2/SUB3 /ROOT/SUB1/SUB3". The movement of the subdirectory 67 from the source subdirectory 64 to the destination subdirectory 63 could interfere with the quota scan in a number of ways. If the scan of the subdirectory 63 was completed before the subdirectory 67 was inserted into the subdirectory 63, then the subdirectory 67 might not be quota checked. This problem can be solved by quota checking the subdirectory 67 during the process of transferring the subdirectory from the source directory 64 to the destination directory 63. However, the subdirectory 67 also has to be scanned in order to quota check the regular files 70 and 71. Moreover, if the scan of the destination directory 63 was not completed before the subdirectory 67 was inserted into the destination directory 63, then the insertion of the subdirectory 67 into the destination directory 63 could cause the quota checking of the subdirectory 66 to be skipped. In general, modification of the content of a directory in a directory tree may interfere with a conventional depth-first traverse of the directory tree as well as a conventional breadth-first traverse of the directory tree.

Figure 4:
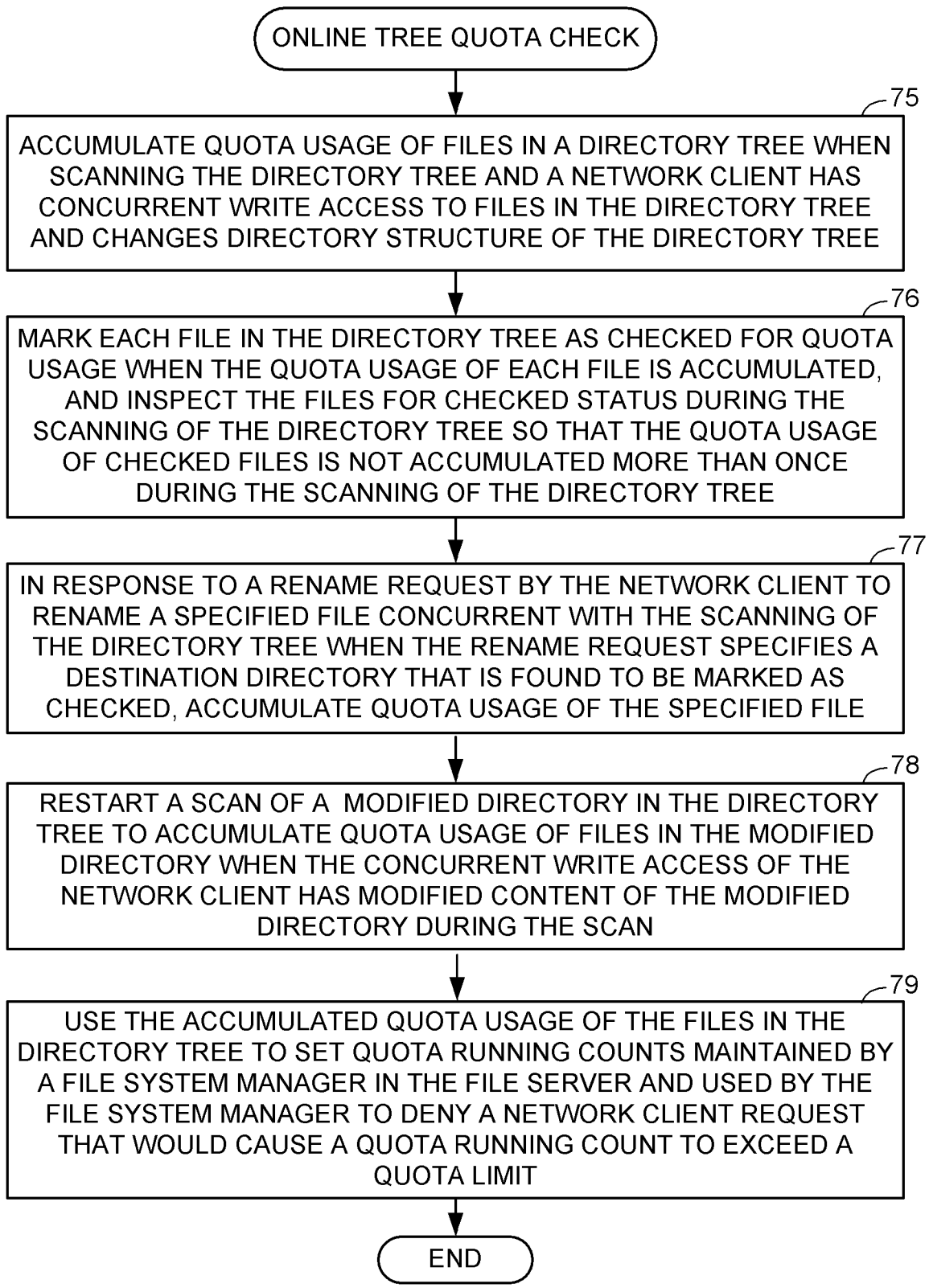
FIG. 4 is a flowchart of an online tree quota method that permits directory structure to be modified by a network client while the directory tree is scanned in background to accumulate quota usage of the files in the directory tree.

FIG. 4 shows an online tree quota checking method that can tolerate concurrent changes to the directory structure. In a first step 75, quota usage of files in a directory tree is accumulated when scanning the directory tree and a network client has concurrent write access to the files in the directory tree and changes the directory structure of the directory tree. In step 76, each file in the directory tree is marked as checked when the quota usage of each file is accumulated, and the files are inspected for checked status during the scanning of the directory tree so that the quota usage of checked files is not accumulated more than once during the scanning of the directory tree. In step 77, in response to a rename request by the network client to rename a specified file concurrent with the scanning of the directory tree when the rename request specifies a destination directory that is found to be marked as checked, quota usage of the specified file is accumulated. In step 78, a scan of a modified directory in the directory tree to accumulate quota usage of files in the modified directory is restarted when concurrent write access of the network client has modified content of the modified directory during the scan. Finally, in step 79, the accumulated quota usage of the files in the directory tree is used to set the quota running counts maintained by the file system manager in the file server and used by the file system manager to deny a network client request that would cause a quota running count to exceed a quota limit.

Figure 5:
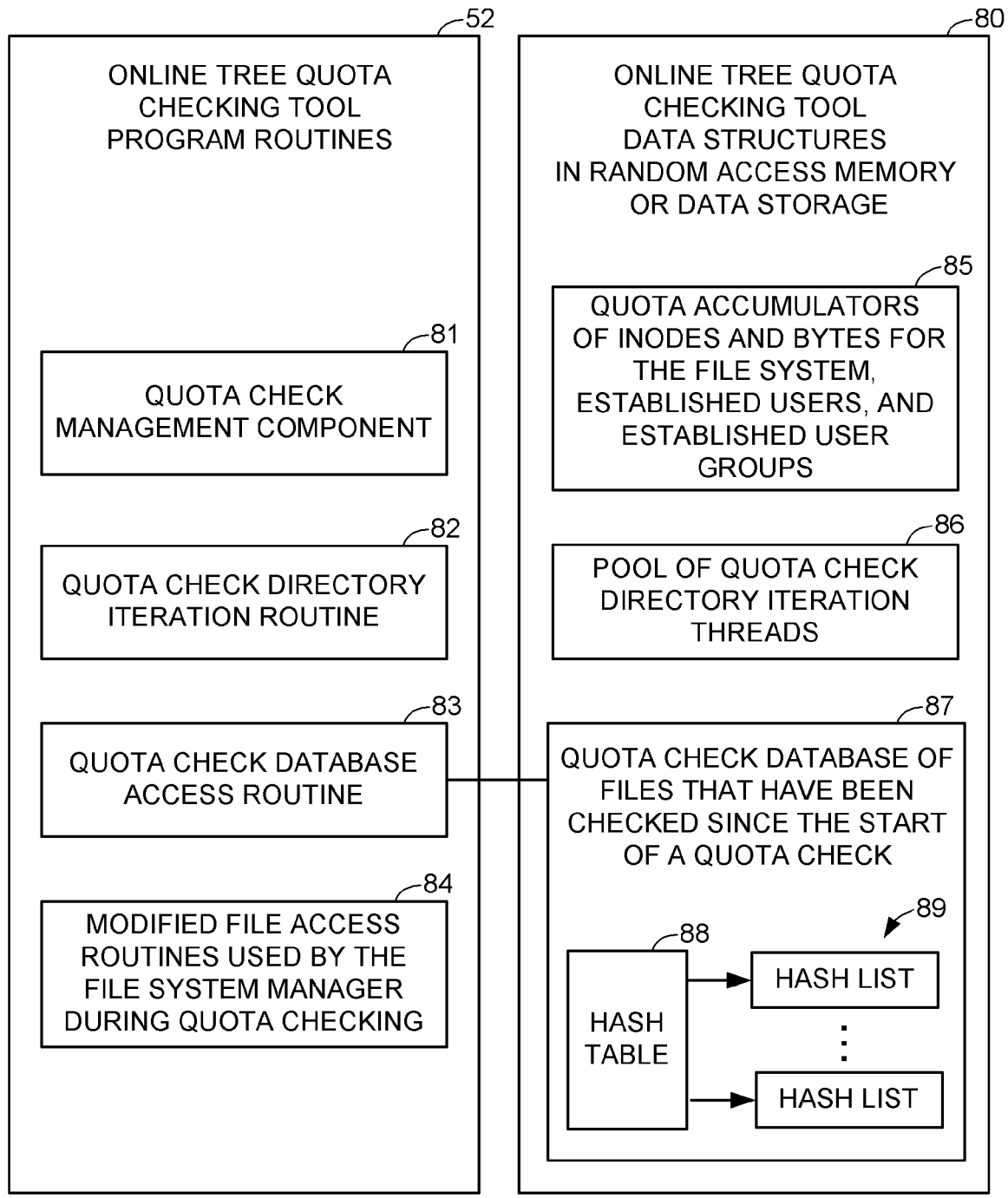
FIG. 5 is a block diagram of the program routines and data structures of a preferred implementation of the online tree quota checking tool.

FIG. 5 shows program routines in a preferred implementation of the online tree quota checking tool 52, and data structures 80 used by these program routines.

The program routines include a quota check management component 81, a quota check directory iteration routine 82, a quota check database access routine 83, and modified file access routines 84 that are used by the file system manager (44 in FIG. 1) during quota checking. The data structures 80 include quota accumulators 85 of inodes and bytes for the file system, established users, and established user groups, a pool 86 of quota check directory iteration threads, and a quota check database 87 of files that have been checked since the start of a quota check.

The quota check management component 81 receives requests for quota checking from an application or client such as a command line interface of the file server or from the workstation of an administrator. The requests for quota checking include "start check", "cancel check", "query check progress", and "dump status". For example, the query check progress and status includes the number of files that have been quota checked, the number of active quota directory iteration threads, and the number of idle quota check directory iteration threads. The query check progress also provides a comparison of the number of files checked to the number of files in any quota running count stored as a file system attribute or maintained by the file system manager in order to estimate a percentage of completion of the quota check for a file system.

Upon completion of a quota check, the calculated quota usage in the quota accumulators 85 is compared to the quota running counts, and the quota running counts can be reset with the calculated quota usage. If the file server crashes during the quota check, then the quota check is terminated. In this case, there is no need to recover intermediate results of the quota check. Instead, the quota check can be restarted during re-boot of the file server, or the administrator can re-issue a quota check request to the quota check management component 81.

The quota check directory iteration thread routine 82 scans a specified directory to quota check the subdirectories and regular files in the specified directory, and also invokes such a scan of each of the subdirectories. In a preferred implementation, the pool of quota check directory iteration threads 86 contains a predetermined number of instances of execution of the quota check directory iteration routine 82. At the start of a quota check of a directory tree, all of the directory iteration threads in the pool 86 are idle, and then the quota check management component 81 activates one of the idle threads to scan the root directory of the directory tree.

The quota check database access routine 83 is called in order to mark a specified file as checked or not, or to determine whether or not a specified file is marked as checked or not. This prevents the quota usage of a file from being accumulated more than once during a quota check if the file is moved. This also prevents the quota usage of a file from being accumulated more than once if the file has multiple hard links. The checked or not state of a file is also used to determine whether or not the quota usage of a file should be updated in response to a delete operation or a write operation that truncates or extends the file.

In a preferred implementation, the quota check database access routine 83 maintains a quota check database 87 separate from the conventional file system data structures so that the quota check database 86 can be quickly initialized at the beginning of a quota check and quickly accessed during the quota check of a directory tree. For example, in the usual case, the directory tree to be scanned contains a very small fraction of the maximum number of inodes in a file system. In this case, a conventional hash index is an efficient way of organizing the quota check database 87. Such a hash index includes a hash table 88 of pointers to hash lists 89. The size of the hash table 88 is initially selected as a fraction of the estimated number of inodes in the directory tree. For example, the estimated number of inodes in the directory tree is the present running count of inodes in the directory tree as maintained by the file system manager, and the number of entries in the hash table 88 is chosen to be one sixteenth of the estimated number of inodes in the directory tree. The quota check database 87 is initialized at the start of a scan by clearing the hash table 88.

In operation, to determine whether or not a specified file is stored in the quota check database, the hash table 88 is indexed by applying a hash function to the inode number of the file. The hash function, for example, is the remainder of the integer division of the inode number by the number of entries in the hash table 88. If the indexed entry in the hash table 88 is zero, then the specified file is not in the quota check database. Otherwise, the indexed entry of the hash table 88 is a pointer to a hash list 89 of inode numbers, and this hash list is scanned to search for the inode number of the specified file.

In order to perform a quota check of a large directory tree, the quota check database 87 is kept in a flat file in the file system (25 in FIG. 1) of the disk storage array (26 in FIG. 1). Pages of this flat file are staged from the disk storage array to the file system cache 37 as needed when the quota check database is accessed.

The modified file access routines 84 are used by the file system manager (44 in FIG. 1) in order to synchronize concurrent file access operations of other applications and clients with the online tree quota checking. For a "change owner" operation or a write operation that truncates or extends a file, if the file has already been checked, then the quota usage is updated; otherwise, nothing needs to be done. For a file create or delete operation, the inode is marked as checked or unchecked accordingly, and the inode usage is updated. For a rename operation, if an unchecked subdirectory is renamed into a checked destination directory, then the subdirectory is quota-checked and scanning of the subdirectory is invoked by dispatching an idle quota check directory iteration thread from the pool 96. The rename operation does not wait for the subdirectory to be scanned.

Figure 6:
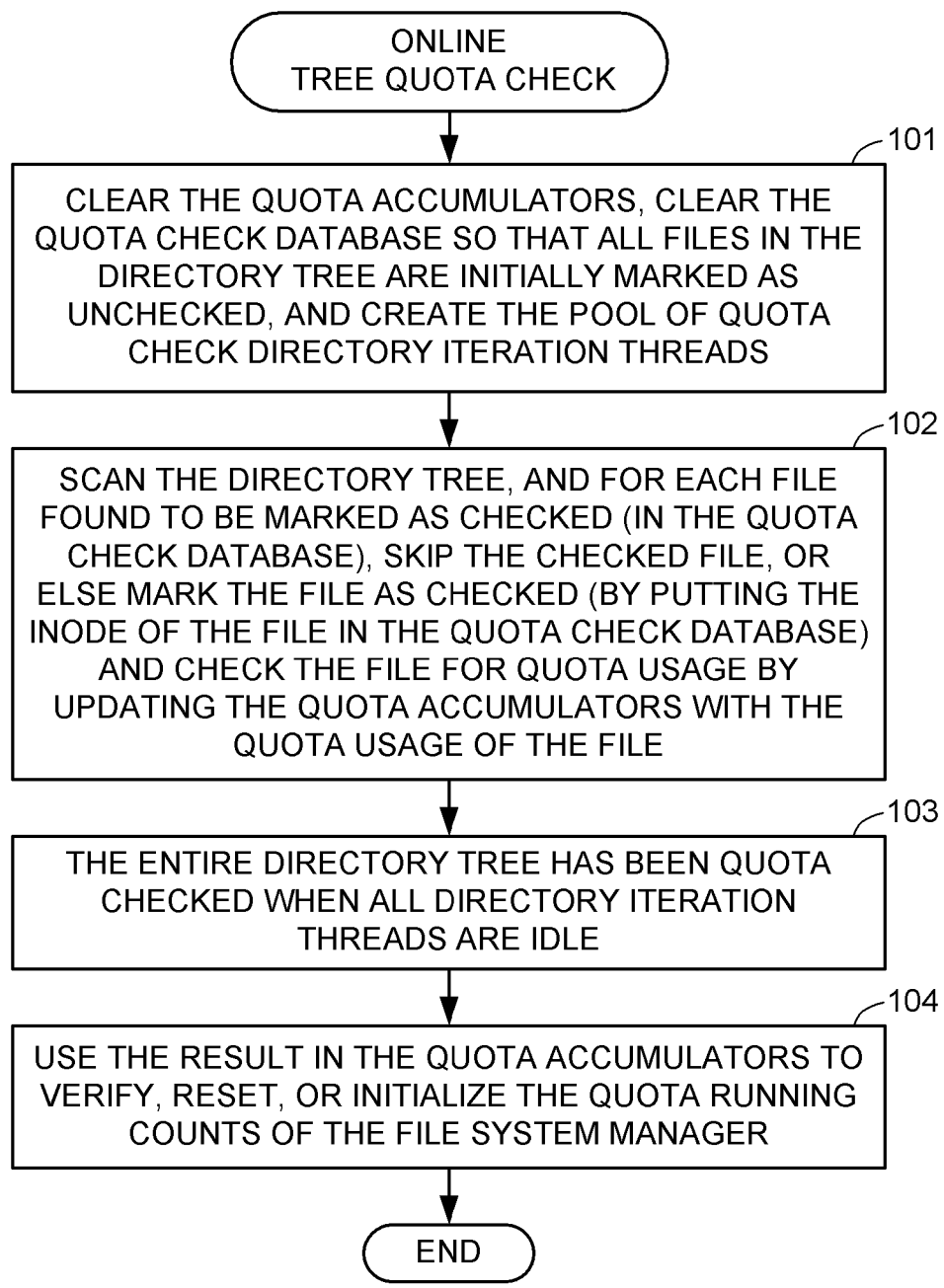
FIG. 6 is a top-level flowchart of the online tree quota checking tool.

FIG. 6 shows a top-level flowchart of a procedure used by the quota check management component for accumulating the quota usage of the directory tree of a specified root directory. In a first step 101, the quota accumulators are cleared, the quota check data base is cleared so that that all files in the directory tree are initially marked as unchecked, and the pool of quota check directory threads is created. In step 102, the directory tree is scanned. For each file found to be marked as checked, the checked file is skipped, or else the file is marked as checked and the file is checked for quota usage by updating the quota accumulators with the quota usage of the file. The quota database is searched for the inode of the file to determine whether or not the file is marked as checked, and the file is marked as checked by writing the inode of the file into the quota check database.

During step 102, concurrent access to the directory tree by other applications and clients may cause directory iteration threads to be dispatched to scan subdirectories. After step 102, execution continues to step 103. In step 103, the quota check management component monitors the status of the quota check directory iteration threads to detect completion of the quota checking when all of the directory threads are idle. Then execution continues from step 103 to step 104 to use the result in the quota accumulators to verify, reset, or initialize the quota running counts of the file system.

Figure 7:
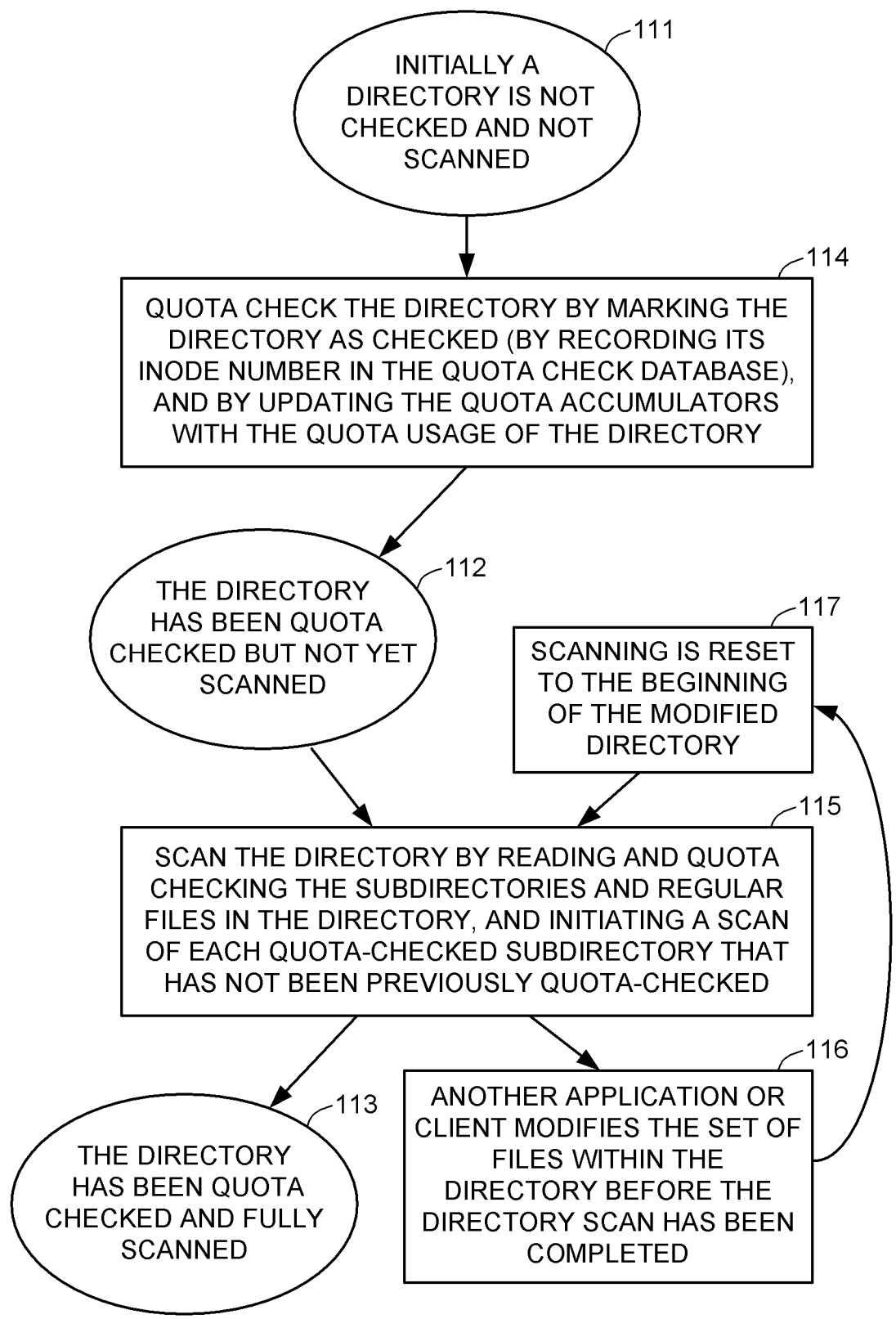
FIG. 7 is a state diagram showing states of a directory in the directory tree during scanning by the online tree quota checking tool.

FIG. 7 shows states of a directory in a directory tree being scanned by the online tree quota checking tool. In an initial state 111, the directory is not checked and not scanned. In a second state 112, the directory has been quota checked but not yet scanned. Quota checking of the directory in step 114 causes the directory to transition from the not checked state to the checked state 112. Quota checking involves marking the directory as checked (by recording its inode number in the quota check database), and updating the quota accumulators with the quota usage of the directory. The quota usage of the directory is one inode, and the size of the directory in bytes. The marking of the directory as checked and the updating of the quota accumulators with the quota usage of the directory occurs as a single transaction. Therefore, whenever any process obtains simultaneous access to the quota check database and to the quota accumulators, the checked and not checked status of the inodes will be consistent with the accumulated quota usage.

The final state of the directory during quota checking is a state 113 of quota checked and fully scanned. Scanning of the directory in step 115 always follows quota checking of the directory in step 114 so that the marking of the directory being quota checked indicates that scanning will occur or has occurred. Thus, the marking of the directory as being quota checked does not indicate that scanning of the directory has actually begun. Scanning of the directory in step 115 involves reading and quota checking the subdirectories and regular files in the directory, and initiating a scan of each quota-checked subdirectory that has not been previously quota-checked.

The scanning of the directory in step 115 is interrupted in step 116 when another application or client modifies the set of files within the directory before the directory scan has been completed. In this case, once the other application or client is finished with modifying the directory, execution continues to step 117 to reset the scanning to the beginning of the modified directory, and then the modified directory is re-scanned in step 115. The scanning in step 115 terminates once all of the files in the directory have been scanned and quota checked so that the directory reaches the state 113 of being quota checked and fully scanned.

In practice, the interruption of the scanning in step 116 and the resetting of the scanning 117 can be done with or without modification of the file system manager routines for sharing file access among applications or clients. For example, it is possible to perform steps 116 and 117 using a UNIX-based file system manager without a file locking manager by having the quota check directory iteration routine check the file modification time attribute of the directory each time that an entry of a regular file or subdirectory is read from the directory in order to obtain the quota usage of the regular file or subdirectory. If the quota check directory iteration routine finds that the file modification time attribute changes during scanning, then the quota check directory iteration routine resets scanning to the beginning of the modified directory.

If the file system manager has a file locking facility, then the directory iteration routine may take a read lock upon the directory for a length of time sufficient to scan and quota check multiple files in the directory, and then release the lock to another application requesting a write lock upon the directory. In this case, after releasing the read lock, the directory iteration routine would reset scanning to the beginning of the modified directory, and resume scanning of the directory once the directory iteration routine would again obtain a read lock upon the directory.

Figure 8:
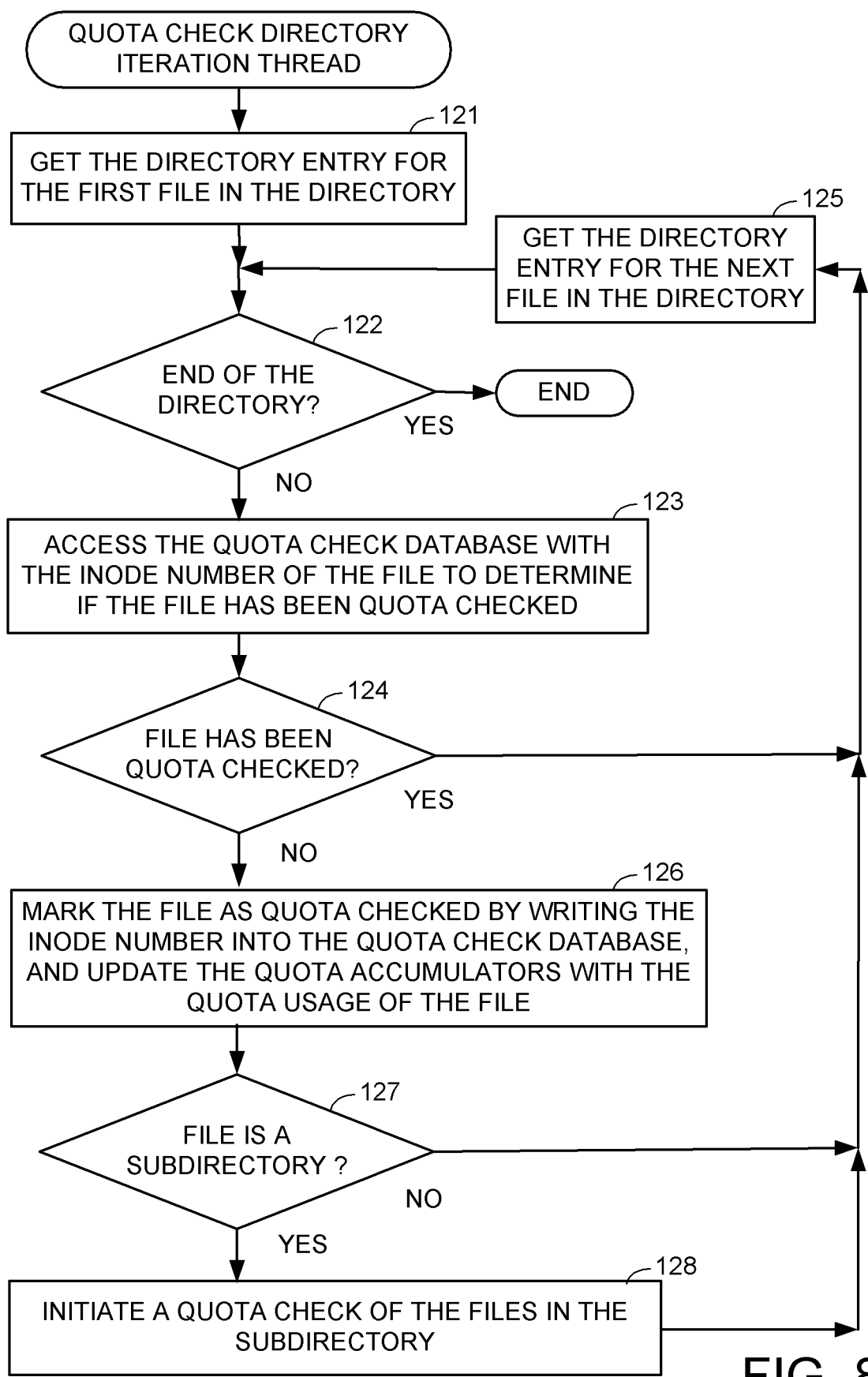
FIG. 8 is a flowchart of a quota check directory iteration thread.

FIG. 8 shows the quota check directory iteration thread. In a first step 121, the directory iteration thread reads the directory entry for the first file in the directory. Next, in step 122, if the end of the directory has been reached, then the quota check directory iteration thread is finished, so that the thread becomes idle. Otherwise, if the end of the directory has not been reached, execution continues to step 123. In step 123, the quota check database is accessed with the inode number of the file read from the directory entry to determine if the file has been quota checked. In step 124, if the file has been quota checked, then execution branches to step 125 to get the directory entry for the next file in the directory. Execution loops from step 125 back to step 122.

In step 124, if the file has not been quota checked, then execution continues to step 126. In step 126, the file is marked as quota checked by writing the inode of the file into the quota check database, and the quota accumulators are updated with the quota usage of the file. In step 127, if the file is not a subdirectory, then execution branches to step 125. Otherwise, if the file is a subdirectory, then execution continues from step 127 to step 128. In step 128, a quota check is initiated of the files in the subdirectory, and then execution continues to step 125.

Step 128 can be performed in a number of ways. For example, if there is an idle quota check directory iteration thread, then an idle quota check directory iteration thread is dispatched to quota check the files in the subdirectory. If there is not an idle directory iteration thread, then step 128 is performed by a recursive call to the quota check directory iteration thread that is presently scanning the directory.

Figure 9:
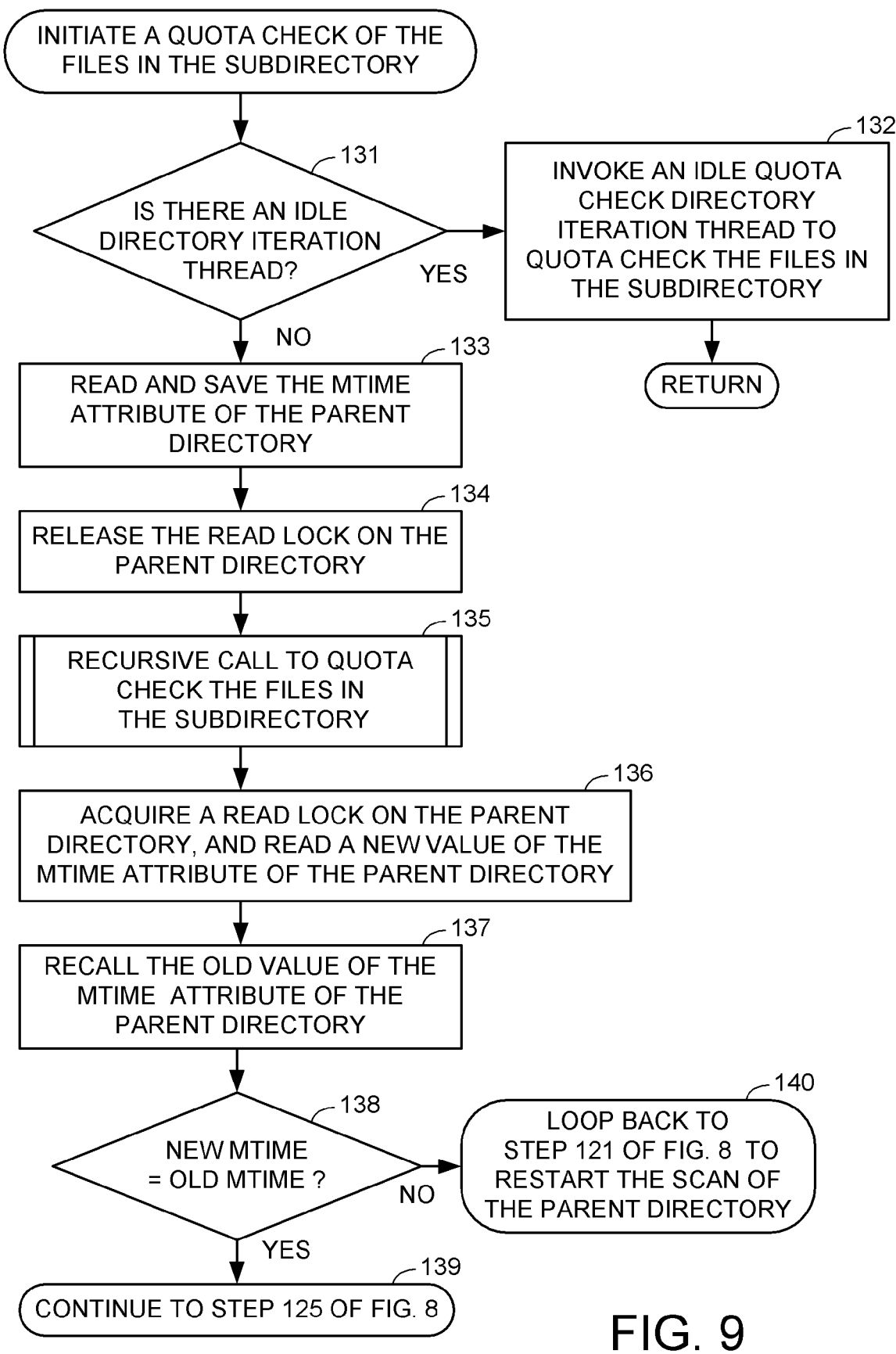
FIG. 9 is a flowchart of a subroutine in the directory iteration thread for initiating a quota check of the files in a subdirectory.

FIG. 9 shows specific operations for performing step 128 of FIG. 8. In a first step 131 of FIG. 9, if there is an idle quota check directory iteration thread, then execution branches to step 132 to invoke an idle quota check directory iteration thread to quota check the files in the subdirectory. After step 132, execution returns (to step 125 in FIG. 8).

In step 131, if there is not an idle directory iteration thread, then execution continues to step 133. In step 133, the file modification time ("mtime") attribute of the parent directory is read and saved, for example by pushing the value of the "mtime" attribute onto the processor stack. In step 134, a read lock on the parent directory is released. In step 135, a recursive call invokes the present quota check directory iteration thread to quota check the files in the subdirectory. In step 136, a read lock is acquired on the parent directory, and a new value of the "mtime" attribute of the parent directory is read from the parent directory. In step 137, the old value of the "mtime" attribute is recalled, for example by popping the value from the processor stack. In step 138, if the new value of the "mtime" attribute is not equal to the old value of the "mtime" attribute, then execution branches to loop back to step 121 of FIG. 8 to restart the scan of the parent directory. Otherwise, if the new value of the "mtime" attribute is equal to the old value of the "mtime" attribute, then execution continues to step 125 of FIG. 8.

Figure 10:
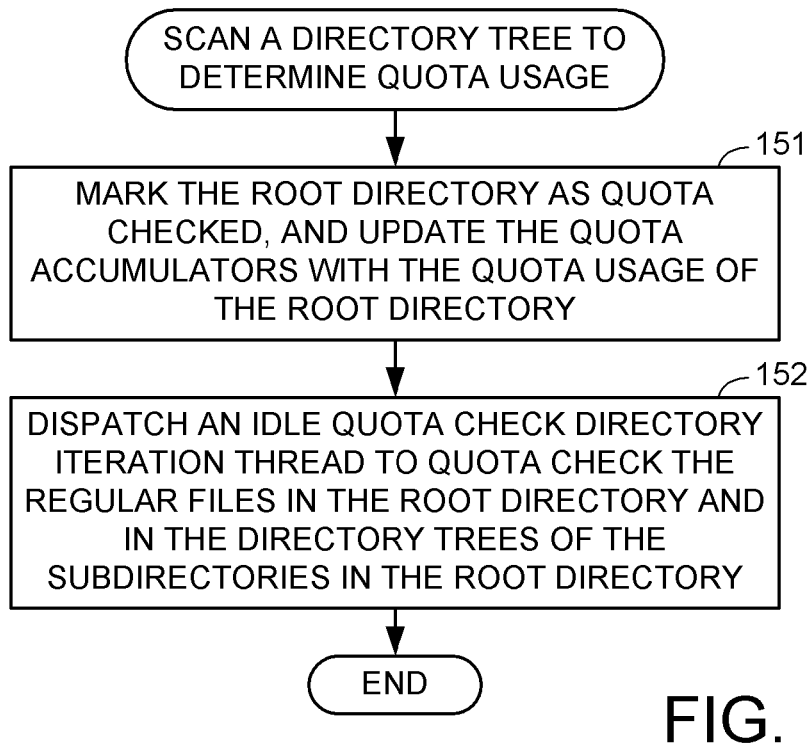
FIG. 10 is a flowchart of a procedure in the online tree quota checking tool for scanning a directory tree to determine quota usage.

FIG. 10 shows a procedure in the online tree quota checking tool for scanning a directory tree to determine quota usage. In a first step 151, the root directory is marked as quota checked, and the quota accumulators are updated with the quota usage of the root directory. In step 152, an idle quota check directory iteration thread is dispatched to quota check the regular files in the root directory and in the directory trees of the subdirectories in the root directory.

Figure 11:
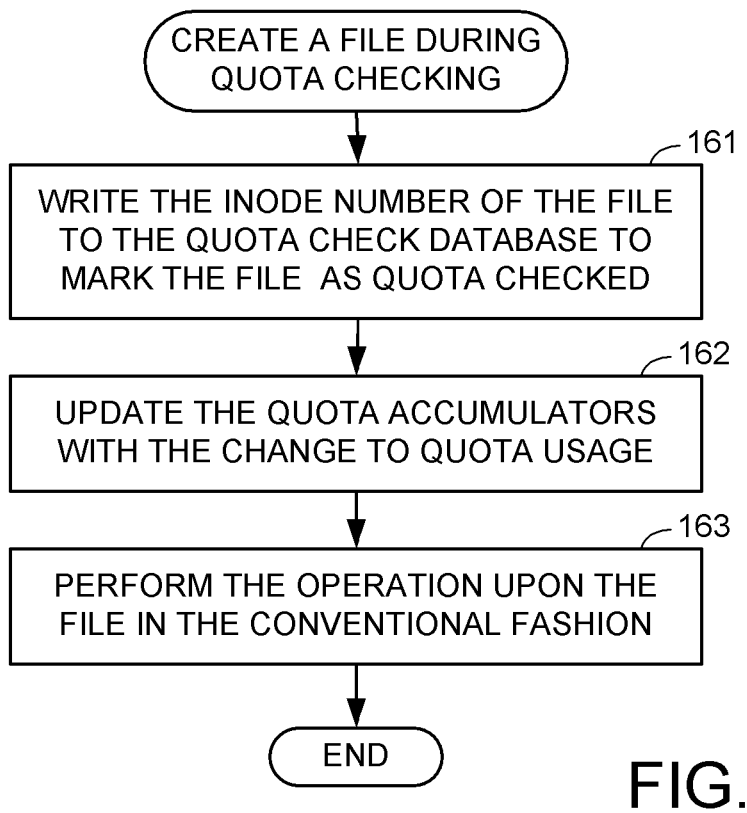
FIG. 11 is a flowchart of a modified file manager routine for creating a file during quota checking.

FIG. 11 is a flowchart of a modified file manager routine for creating a file during quota checking. In a first step 161, the inode number of the file is written to the quota check database to mark the file as quota checked. In step 162, the quota accumulators are updated with the change to the quota usage. Thus, the inode accumulators are incremented by one, and the byte accumulators are incremented by the number of bytes of the new file. In step 163, the "create file" operation is performed in the conventional fashion.

Figure 12:
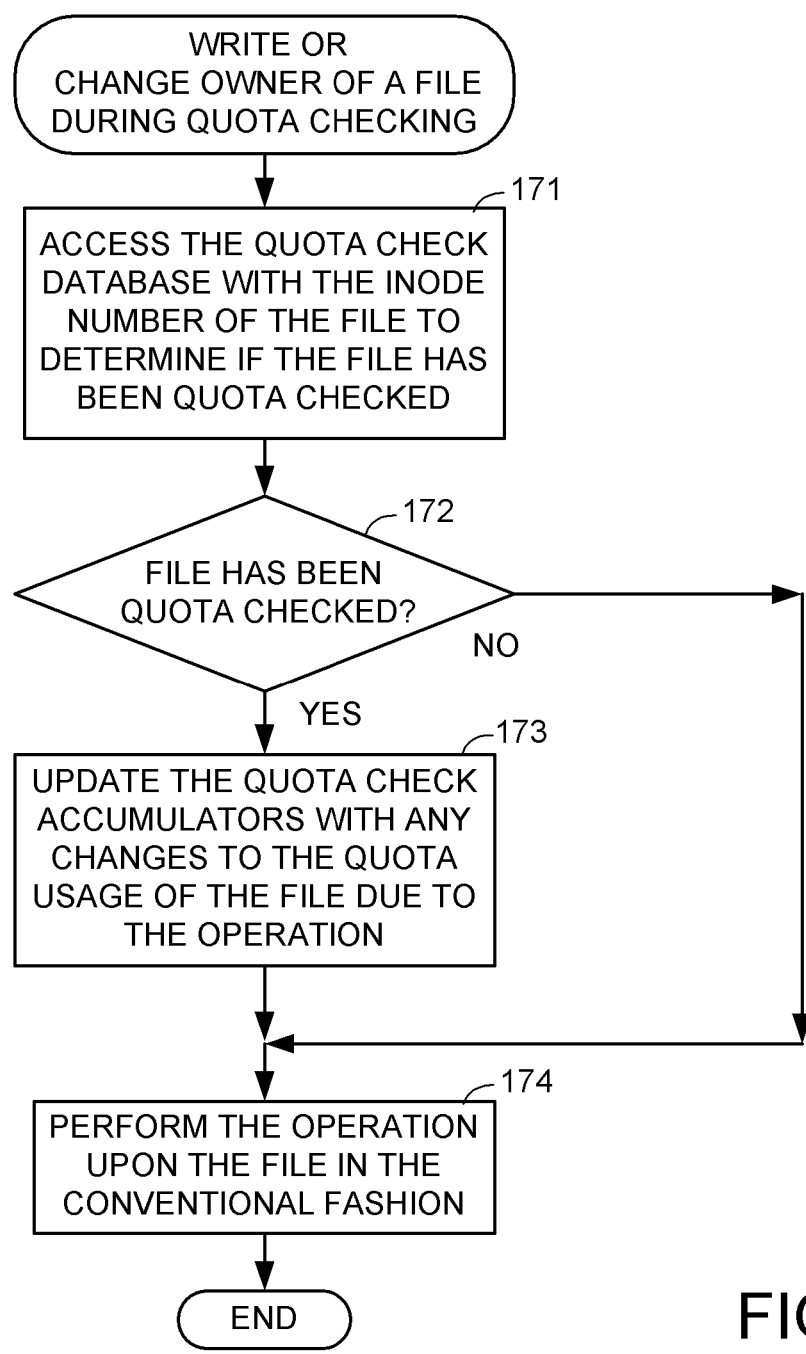
FIG. 12 is a flowchart of a modified file manager routine for writing to a file or changing ownership of a file during quota checking.

FIG. 12 shows a modified file manager routine for writing to a file or changing ownership of a file during quota checking. In a first step 171, the quota check database is accessed with the inode number of the file to determine if the file has been quota checked. In step 172, if the file has not been quota checked, then execution branches to step 174 to perform the operation upon the file in the conventional fashion. In this case, the quota usage of the file will be updated at a later time.

In step 172, if the file has been quota checked, then execution continues to step 173 to update the quota accumulators with any changes to the quota usage of the file due to the operation. In this case, the quota accumulators already include the quota usage of the file prior to the modification of the write or change owner operation. For a write operation, the quota byte accumulators are incremented by any byte extension of the file, and decremented by any byte truncation of the file. For a change owner of the file, the inode accumulators of the old owner and user groups of the old owner are decremented by one, the inode accumulators of the new owner and user groups of the new owner are incremented by one, the byte accumulators of the old owner and user groups of the old owner are decremented by the number of bytes in the file, and the byte accumulators of the new owner and user groups of the new owner are incremented by the number of bytes in the file. Execution continues from step 173 to step 174 to perform the write or change owner operation upon the file in the conventional fashion.

Figure 13:
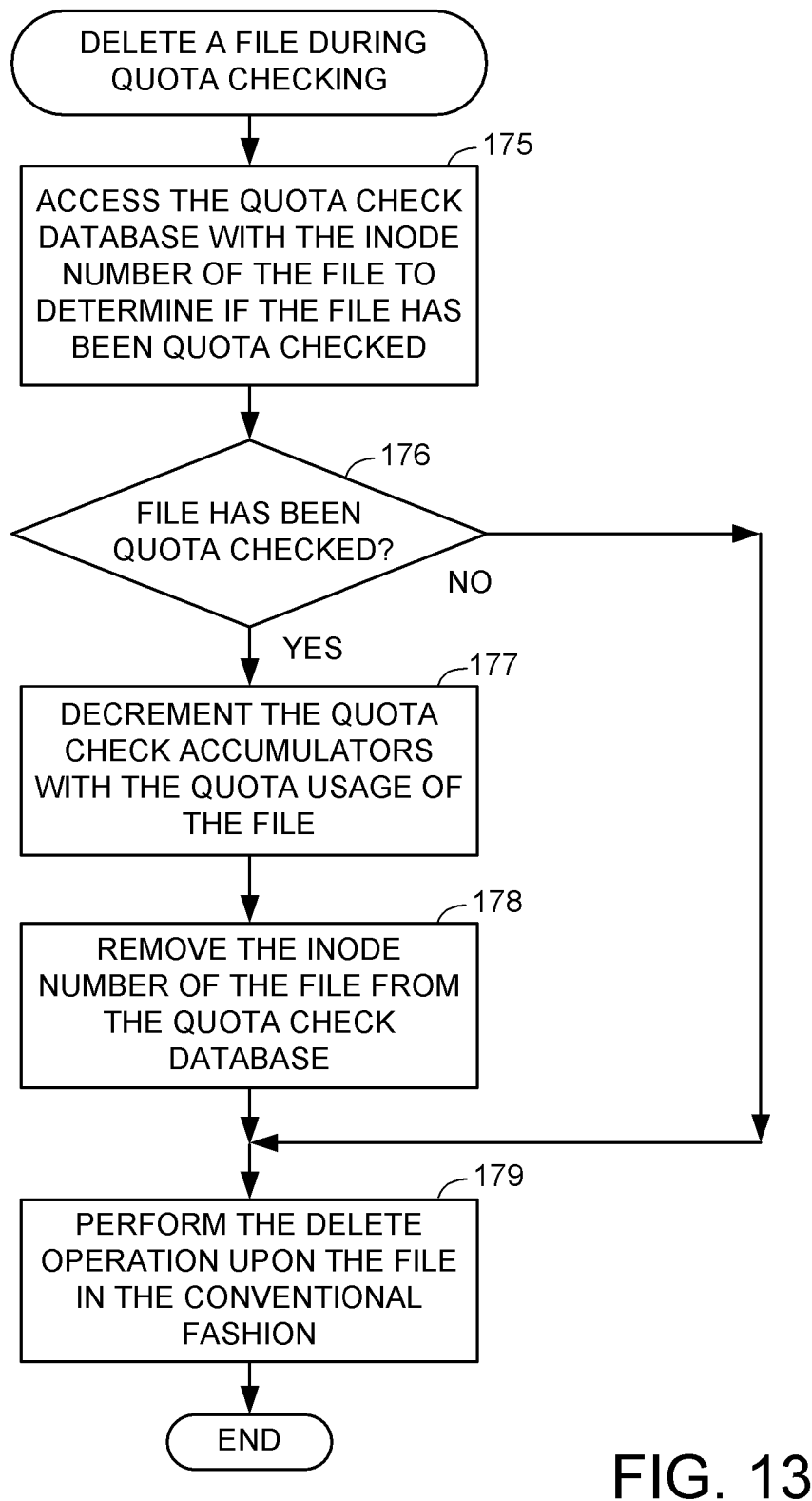
FIG. 13 is a flowchart of a modified file manager routine for deleting a file during quota checking.

FIG. 13 shows a modified file manager routine for deleting a file during quota checking. In a first step 175, the quota check database is accessed with the inode number of the file to determine if the file has been quota checked. In step 176, if the file has not been quota checked, then execution branches to step 179 to perform the delete operation upon the file in the conventional fashion.

In step 176, if the file has been quota checked, then execution continues to step 177 to decrement the quota accumulators with the quota usage of the file. In this case, the quota accumulators already include the quota usage of the file prior to the delete operation. Therefore, in step 177, the inode accumulators are decremented by one, and the byte accumulators are decremented by the number of bytes in the file. Execution continues from step 177 to step 178. In step 178, the inode of the file is removed from the quota check database. Execution continues from step 178 to step 179 to perform the delete operation upon the file in the conventional fashion.

Figure 14:
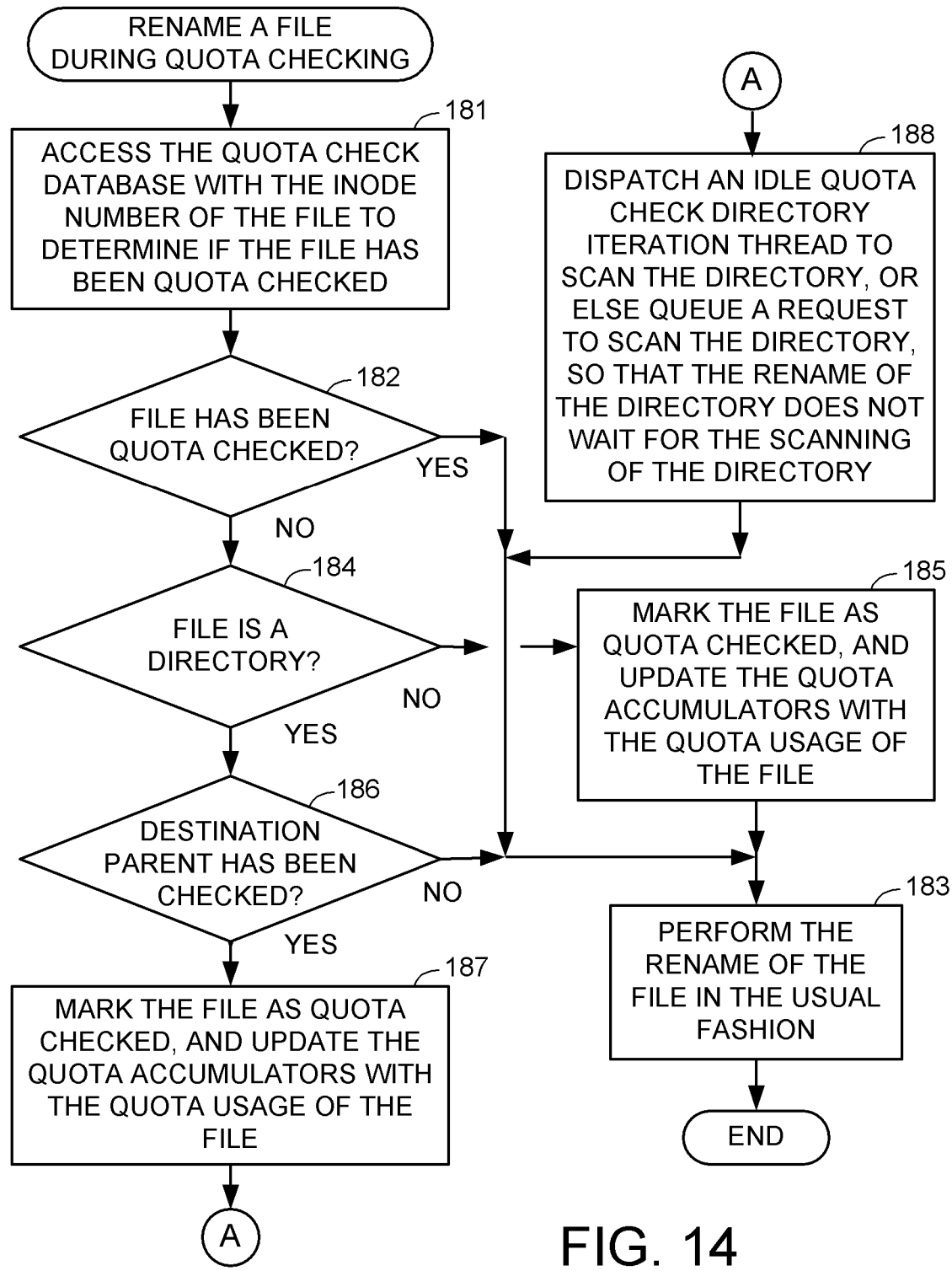
FIG. 14 is a flowchart of a modified file manager routine for renaming a file during quota checking.

FIG. 14 is a flowchart of a modified file manager routine for renaming a file during quota checking. In a first step 181, the quota check database is accessed with the inode number of the file to determine if the file has been quota checked. In step 182, if the file has been quota checked, then execution branches to step 183 to perform the rename of the file in the usual fashion.

In step 182, if the file has not been quota checked, then execution continues to step 184. In step 184, if the file is not a directory, then execution branches to step 185 to mark the file as quota checked, and update the quota accumulators with the quota usage of the file. Execution continues from step 185 to step 183 to perform the rename of the file in the usual fashion.

In step 184, if the file is a directory, then execution continues to step 186. In step 186, if the destination parent directory has not been checked, then execution branches to step 183 to perform the rename of the file in the usual fashion.

In step 186, if the destination parent directory has been checked, then execution continues to step 187. In step 187, the file is marked as quota checked, and the quota accumulators are updated with the quota usage of the file. Execution continues from step 187 to step 188. In step 188, an idle quota check directory iteration thread is dispatched to scan the directory, or else a request to scan the directory is queued, so that the rename of the directory does not wait for the scanning of the directory to accumulate the quota usage of files in the directory. For example, if there is no directory iteration thread that is presently idle, a request to dispatch an idle directory iteration thread is queued so that an idle directory iteration thread is dispatched to scan the directory once a directory iteration thread becomes idle. Execution continues from step 188 to step 183 to perform the rename of the file in the usual fashion.

In view of the above, there has been described an online tree quota check tool for computing quota usage of files in a directory tree while the structure of the directory tree keeps changing due to concurrent write access by other applications and clients. The online tree quota check tool runs as a background task to compute the quota usage without interfering with ongoing file access operations that change the directory content as well as the quota usage. A quota check database keeps track of which files have been checked and which have not, so that the each file is checked and its quota usage is accumulated once and only once while directories are moved and directory quota check scans are restarted as a result of ongoing file access operations that change the directory content. File system operations are modified to synchronize with the online tree quota check.

The online tree quota check tool can be single threaded or multi-threaded depending on how much CPU processing power one would like to allocate to the quota checking tool. For multi-threaded operation, a pool of threads is created to do the directory iteration. A single thread in the pool starts the iteration of the root directory. Each time that an iteration thread visits a sub-directory, it dispatches another idle thread to iterate that sub-directory, or if there is no idle thread, then the iteration thread itself iterates that subdirectory.

What is claimed is:

1. A method comprising a data processor of a file server executing computer instructions stored on a non-transitory computer-readable storage medium to perform the steps of:
    (a) accumulating quota usage of files in a directory tree when scanning the directory tree and a network client has concurrent write access to the files in the directory tree and changes directory structure of the directory tree;
    (b) marking each file in the directory tree as checked for quota usage when the quota usage of said each file is accumulated, and inspecting the files for checked status during the scanning of the directory tree so that quota usage of checked files is not accumulated more than once during the scanning of the directory tree;
    (c) in response to a rename request by the network client to rename a specified file concurrent with the scanning of the directory tree when the rename request specifies a destination directory that is found to be marked as checked, accumulating quota usage of the specified file;
    (d) restarting a scan of a modified directory in the directory tree to accumulate quota usage of files in the modified directory when the concurrent write access of the network client has modified content of the modified directory during the scan; and
    (e) using the accumulated quota usage from the steps (a), (c), and (d) to set quota running counts maintained by a file system manager in the file server and used by the file system manager to deny a network client request that would cause a quota running count to exceed a quota limit.

2. The method as claimed in claim 1, wherein step (a) includes the data processor concurrently executing multiple threads that accumulate quota usage of files in respective directories of the directory tree.

3. The method as claimed in claim 2, wherein step (a) includes a thread scanning a parent directory dispatching an idle one of the multiple threads to accumulate quota usage of files in a subdirectory of the parent directory.

4. The method as claimed in claim 1, wherein step (b) includes marking each file in the directory tree as checked for quota usage by storing an identifier of said each file in a database, and inspecting the files for checked status during the scanning of the directory tree by searching the database for the identifiers of the files.

5. The method as claimed in claim 1, wherein the rename request specifies a directory to be renamed, and step (c) includes initiating a scan of the specified directory to accumulate quota usage of files in the specified directory so that the renaming of the specified directory does not wait for the specified directory to be scanned to accumulate quota usage of files in the specified directory.

6. The method as claimed in claim 1, wherein the rename request specifies a directory to be renamed, and step (c) includes dispatching an idle thread to accumulate quota usage of files in the specified directory in response to the rename request.

7. A method comprising a data processor of a file server executing computer instructions stored on a non-transitory computer-readable storage medium to perform the steps of:
    (a) accumulating quota usage of files in a directory tree when scanning the directory tree and a network client has concurrent write access to the files in the directory tree and changes directory structure of the directory tree;
    (b) marking each file in the directory tree as checked for quota usage when the quota usage of said each file is accumulated, and inspecting the files for checked status during the scanning of the directory tree so that quota usage of checked files is not accumulated more than once during the scanning of the directory tree;
    (c) in response to a rename request by the network client to rename a specified file concurrent with the scanning of the directory tree when the rename request specifies a destination directory that is found to be marked as checked, accumulating quota usage of the specified file;
    (d) restarting a scan of a modified directory in the directory tree to accumulate quota usage of files in the modified directory when the concurrent write access of the network client has modified content of the modified directory during the scan; and
    (e) using the accumulated quota usage from the steps (a), (c), and (d) to set quota running counts maintained by a file system manager in the file server and used by the file system manager to deny a network client request that would cause a quota running count to exceed a quota limit;
    wherein step (d) includes inspecting a modification time attribute of the modified directory, and restarting the scan of the modified directory in response to finding that the modification time attribute of the modified directory has changed while scanning the modified directory to accumulate quota usage of the files in the modified directory.

8. A file server comprising:
    data storage storing a file system;
    a data processor coupled to the data storage for accessing the file system;
    a network adapter for connecting network clients to the data processor for receiving file access requests from the network clients and exchanging file data between the network clients and the data processor; and
    non-transitory computer readable storage medium coupled to the data processor and storing computer instructions that when executed by the data processor perform the steps of:
    (a) accumulating quota usage of files in a directory tree of the file system when scanning the directory tree and a network client has concurrent write access to the files in the directory tree and changes directory structure of the directory tree;

(b) marking each file in the directory tree as checked for quota usage when the quota usage of said each file is accumulated, and inspecting the files for checked status during the scanning of the directory tree so that quota usage of checked files is not accumulated more than once during the scanning of the directory tree;

(c) in response to a rename request by the network client to rename a specified file concurrent with the scanning of the directory tree when the rename request specifies a destination directory that is found to be marked as checked, accumulating quota usage of the specified file; and (d) restarting a scan of a modified directory in the directory tree to accumulate quota usage of files in the modified directory when the concurrent write access of the network client has modified content of the modified directory during the scan.

9. The file server as claimed in claim 8, wherein step (a) includes the data processor concurrently executing multiple threads that accumulate quota usage of files in respective directories of the directory tree.

10. The file server as claimed in claim 9, wherein step (a) includes a thread scanning a parent directory dispatching an idle one of the multiple threads to accumulate quota usage of files in a subdirectory of the parent directory.

11. The file server as claimed in claim 8, wherein step (b) includes marking each file in the directory tree as checked for quota usage by storing an identifier of said each file in a database, and inspecting the files for checked status during the scanning of the directory tree by searching the database for the identifiers of the files.

12. The file server as claimed in claim 8, wherein the rename request specifies a directory to be renamed, and step (c) includes initiating a scan of the specified directory to accumulate quota usage of files in the specified directory so that the renaming of the specified directory does not wait for the specified directory to be scanned to accumulate quota usage of files in the specified directory.

13. The file server as claimed in claim 8, wherein the rename request specifies a directory to be renamed, and step (c) includes dispatching an idle thread to accumulate quota usage of files in the specified directory in response to the rename request.

14. A file server comprising:
data storage storing a file system;
a data processor coupled to the data storage for accessing the file system;
a network adapter for connecting network clients to the data processor for receiving file access requests from the network clients and exchanging file data between the network clients and the data processor; and
non-transitory computer readable storage medium coupled to the data processor and storing computer instructions that when executed by the data processor perform the steps of:

(a) accumulating quota usage of files in a directory tree of the file system when scanning the directory tree and a network client has concurrent write access to the files in the directory tree and changes directory structure of the directory tree;

(b) marking each file in the directory tree as checked for quota usage when the quota usage of said each file is accumulated, and inspecting the files for checked status during the scanning of the directory tree so that quota usage of checked files is not accumulated more than once during the scanning of the directory tree;

(c) in response to a rename request by the network client to rename a specified file concurrent with the scanning of the directory tree when the rename request specifies a destination directory that is found to be marked as checked, accumulating quota usage of the specified file; and (d) restarting a scan of a modified directory in the directory tree to accumulate quota usage of files in the modified directory when the concurrent write access of the network client has modified content of the modified directory during the scan;

wherein step (d) includes inspecting a modification time attribute of the modified directory, and restarting the scan of the modified directory in response to finding that the modification time attribute of the modified directory has changed while scanning the modified directory to accumulate quota usage of the files in the modified directory.

15. A file server comprising:
data storage storing a file system;
a data processor coupled to the data storage for accessing the file system;
a network adapter for connecting network clients to the data processor for receiving file access requests from the network clients and exchanging file data between the network clients and the data processor; and
non-transitory computer readable storage medium coupled to the data processor and storing computer instructions;
wherein the computer instructions include:
a quota check management component for initiating an online tree quota check of a directory tree of the file system while a network client has concurrent write access to the files in the directory tree and changes directory structure of the directory tree;
a quota check directory iteration routine for scanning a specified directory of the directory tree and accumulating quota usage of files in the specified directory and initiating scans of subdirectories of the specified directory to accumulate quota usage of files in the subdirectories;
a quota check database access routine for accessing a quota check database of files that have been checked for quota usage since an initiation of said online tree quota check; and
modified file access routines for use by a file system manager during the online quota check;
wherein the computer instructions, when executed by the data processor, perform the steps of:

(a) performing the online tree quota check of the directory tree of the file system by executing the quota check directory iteration routine to scan directories of the directory tree while the network client has concurrent write access to the files in the directory tree and changes directory structure of the directory tree;

(b) accessing the quota check database to keep a record of files in the directory tree that have been checked for quota usage by accumulating quota usage, and accessing the quota check database during the scanning of the directory tree so that quota usage of checked files is not accumulated more than once during the scanning of the directory tree;

(c) in response to a rename request by the network client to rename a specified file concurrent with the scanning of the directory tree when the rename request specifies a destination directory that is found in the quota check database, accumulating quota usage of the specified file; and (d) restarting a scan of a modified directory in the directory tree to accumulate quota usage of files in the modified directory when the concurrent write access of the network client has modified content of the modified directory during the scan.

16. The file server as claimed in claim 15, wherein the computer instructions, when executed by the data processor, begin an online tree quota check by clearing quota check accumulators, clearing the quota check database so that all files in the directory tree are initially marked as unchecked, and creating a pool of directory iteration threads.

17. The file server as claimed in claim 15, wherein the directory iteration routine, when executed by the data processor, initiates a scan of a subdirectory of the specified directory to accumulate quota usage of files in the subdirectory by checking whether there is an idle directory iteration thread in a pool of directory iteration threads, and upon finding that there is an idle directory iteration thread in the pool of directory iteration threads, dispatching an idle directory thread from the pool of directory iteration threads to scan the subdirectory to accumulate quota usage of files in the subdirectory.

18. The file server as claimed in claim 15, wherein the directory iteration routine, when executed by the data processor, checks whether there is an idle directory iteration thread in a pool of directory iteration threads, and upon finding that there is not an idle directory iteration thread in the pool of directory iteration threads, the directory iteration routine scans the subdirectory to accumulate quota usage of files in the subdirectory.

19. A file server comprising:
data storage storing a file system;
a data processor coupled to the data storage for accessing the file system;
a network adapter for connecting network clients to the data processor for receiving file access requests from the network clients and exchanging file data between the network clients and the data processor; and
non-transitory computer readable storage medium coupled to the data processor and storing computer instructions;
wherein the computer instructions include:
a quota check management component for initiating an online tree quota check of a directory tree of the file system while a network client has concurrent write access to the files in the directory tree and changes directory structure of the directory tree;
a quota check directory iteration routine for scanning a specified directory of the directory tree and accumulating quota usage of files in the specified directory and initiating scans of subdirectories of the specified directory to accumulate quota usage of files in the subdirectories;
a quota check database access routine for accessing a quota check database of files that have been checked for quota usage since an initiation of said online tree quota check; and modified file access routines for use by a file system manager during the online quota check;
wherein the computer instructions, when executed by the data processor, perform the steps of:

(a) performing the online tree quota check of the directory tree of the file system by executing the quota check directory iteration routine to scan directories of the directory tree while the network client has concurrent write access to the files in the directory tree and changes directory structure of the directory tree;

(b) accessing the quota check database to keep a record of files in the directory tree that have been checked for quota usage by accumulating quota usage, and accessing the quota check database during the scanning of the directory tree so that quota usage of checked files is not accumulated more than once during the scanning of the directory tree;

(c) in response to a rename request by the network client to rename a specified file concurrent with the scanning of the directory tree when the rename request specifies a destination directory that is found in the quota check database, accumulating quota usage of the specified file; and (d) restarting a scan of a modified directory in the directory tree to accumulate quota usage of files in the modified directory when the concurrent write access of the network client has modified content of the modified directory during the scan;

wherein the directory iteration routine, when executed by the data processor, checks whether there is an idle directory iteration thread in a pool of directory iteration threads, and upon finding that there is not an idle directory iteration thread in the pool of directory iteration threads, the directory iteration routine scans the subdirectory to accumulate quota usage of files in the subdirectory; and wherein the directory iteration routine, when executed by the data processor, saves an old value of a modification time attribute of the specified directory prior to scanning the subdirectory to accumulate quota usage of files in the subdirectory, and upon completing the scanning the subdirectory to accumulate quota usage of files in the subdirectory, compares the old value of the modification time attribute of the specified directory to a new value of the modification time attribute of the specified directory to determine that the specified directory has been modified, and upon determining that the specified directory has been modified, restarting a scan of the specified directory to accumulate quota usage of files in the specified directory.

20. The file server as claimed in claim 15, wherein the rename request specifies a directory to be renamed, and step (c) includes dispatching an idle directory iteration thread from a pool of directory iteration threads to accumulate quota usage of files in the specified directory in response to the rename request.

* * * * *